(12) United States Patent
Xie et al.

(10) Patent No.: US 8,595,834 B2
(45) Date of Patent: Nov. 26, 2013

(54) DETECTING UNAUTHORIZED USE OF COMPUTING DEVICES BASED ON BEHAVIORAL PATTERNS

(75) Inventors: Liang Xie, State College, PA (US);
Xinwen Zhang, San Jose, CA (US);
Jean-Pierre Seifert, San Jose, CA (US);
Onur Aciicmez, San Jose, CA (US);
Afshin Latifi, San Jose, CA (US)

(73) Assignee: Samsung Electronics Co., Ltd, Suwon (KR)

( * ) Notice: Subject to any disclaimer, the term of this patent is extended or adjusted under 35 U.S.C. 154(b) by 1250 days.

(21) Appl. No.: 12/025,678

(22) Filed: Feb. 4, 2008

(65) Prior Publication Data

US 2009/0199296 A1    Aug. 6, 2009

(51) Int. Cl.
*G06F 21/00*    (2013.01)
*H04L 29/06*    (2006.01)

(52) U.S. Cl.
CPC ......... *H04L 63/1416* (2013.01); *H04L 63/1408* (2013.01); *H04L 63/145* (2013.01)
USPC .............................................. 726/23; 726/22

(58) Field of Classification Search
None
See application file for complete search history.

(56) References Cited

U.S. PATENT DOCUMENTS

| | | | | |
|---|---|---|---|---|
| 7,162,741 B2* | 1/2007 | Eskin et al. | | 726/25 |
| 7,900,194 B1* | 3/2011 | Mankins | | 717/127 |
| 2002/0112185 A1* | 8/2002 | Hodges | | 713/201 |
| 2004/0025015 A1* | 2/2004 | Satterlee et al. | | 713/164 |
| 2004/0103296 A1* | 5/2004 | Harp et al. | | 713/200 |
| 2005/0028082 A1* | 2/2005 | Topalov et al. | | 715/505 |
| 2005/0086500 A1* | 4/2005 | Albornoz | | 713/188 |
| 2007/0239604 A1* | 10/2007 | O'Connell et al. | | 705/50 |
| 2010/0146622 A1* | 6/2010 | Nordstr m et al. | | 726/23 |

OTHER PUBLICATIONS

Hofmeyr S., Forrest, S., Somayaji, A., "Intrusion detection using sequences of system calls", Jan. 1, 1998, Journal of Computer Security, vol. 6, No. 3/1998, IOS Press, p. 151-180 [downloaded from: http://citeseerx.ist.psu.edu/viewdoc/download?doi=10.1.1.43.6197 &rep=rep1&type=pdf on Mar. 9, 2010).*
"Out-of-band management"—Wikipedia, the free encyclopedia, http://wikipedia.org/wild/Out-of-band_management.
"Intel Active Management Technology"—Wikipedia, the free encyclopedia, http://wikipedia.org/wiki/Intel_Active_Management_Technology.

(Continued)

*Primary Examiner* — Ashok Patel
*Assistant Examiner* — Alexander Lagor
(74) *Attorney, Agent, or Firm* — Kenneth L. Sherman, Esq.; Michael Zarrabian, Esq.; Sherman & Zarrabian LLP

(57) ABSTRACT

Techniques for detecting unauthorized use (e.g., malicious attacks) of the computing systems (e.g., computing devices) are disclosed. Unauthorized use can be detected based on patterns of use (e.g., behavioral patterns of use typically associated with a human being) of the computing systems. Acceptable behavioral pattern data can be generated for a computing system by monitoring the use of a support system (e.g., an operating system, a virtual environment) operating on the computing system. For example, a plurality of system support provider components of a support system (e.g., system calls, device drivers) can be monitored in order to generate the acceptable behavioral pattern data in a form which effectively defines an acceptable pattern of use (usage pattern) for the monitored system support provider components, thereby allowing detection of unauthorized use of a computing system by detecting any deviation from the acceptable pattern of use of the monitored system support provider components.

21 Claims, 10 Drawing Sheets

(56) References Cited

OTHER PUBLICATIONS

Caceres et al., "Trusted Mobile Computing," Proc. of IFIP Workshop on security and Privacy in Mobile and Wireless Networks, May 2006.

M. Costa et al., "Vigilante: End-to-end containment of internet worms," In Proceedings of the 20$^{th}$ ACM Symposium on Operating systems Principles (SOSP'05), Oct. 2005.

Newsome et al., "Dynamic Taint analysis for Automatic Detection, Analysis, and Signature Generation of Exploits on Commodity Software," In Proceedings of the 12$^{th}$ Annual Network and Distributed System Security Symposium, 2005.

Suh et al., "Secure Program Execution via Dynamic Information Flow Tracking," In Proceedings of the 11$^{th}$ International Conference on Architectural Support for Programming Languages and Operating Systems (ASPLOS'04), Oct. 2004.

"OMTP Device Management Enabler Requirements," OMTP Device Management Enabler Version 1_0, OMTP Ltd., 2006.

\* cited by examiner

```
PhoneLaunchView : : mousepressEvent (QWSEvent *event)
{
    itemCode = getItemAt (event→pos());
    updateUI (itemCode) ;
    /* processed like a keypad input */
    processItem (itemCode) ;
    ...}
```

DETECTING UNAUTHORIZED USE OF COMPUTING DEVICES BASED ON BEHAVIORAL PATTERNS

BACKGROUND OF THE INVENTION

Conceptually, a computing system (e.g., a computing device, a personal computer, a laptop, a Smartphone, a mobile phone) can accept information (content or data) and manipulate it to obtain or determine a result based on a sequence of instructions (or a computer program) that effectively describes how to process the information. Typically, the information used by a computing system is stored in a in a computer readable memory using a digital or binary form. More complex computing systems can store content including the computer program itself. A computer program may be invariable and/or built into, for example a computer (or computing) device as logic circuitry provided on microprocessors or computer chips. Today, general purpose computers can have both kinds of programming. A computing system can also have a support system which, among other things, manages various resources (e.g., memory, peripheral devices) and services (e.g., basic functions such as opening files) and allows the resources to be shared among multiple programs. One such support system is generally known and an Operating System (OS) which provides programmers with an interface used to access these resources and services.

Today, numerous types of computing devices are available. These computing devices widely range with respect to size, cost, amount of storage and processing power, from the expensive and powerful servers, relatively cheaper Personal Computers (PC's) and laptops, to more inexpensive microprocessors or computer chips provided in storage devices, automobiles, and household electronic appliances.

In recent years, computing systems have become more portable and mobile. As a result, various mobile and handheld devices have been made available. By way of example, wireless phones, media players, Personal Digital Assistants (PDA's) are widely used today. Generally, a mobile or a handheld device (also known as handheld computer or simply handheld) can be a pocket-sized computing device, typically utilizing a small visual display screen for user output and a miniaturized keyboard for user input. In the case of a Personal Digital Assistant (PDA), the input and output can be combined into a touch-screen interface.

In particular, mobile communication devices (e.g., mobile phones) have become extremely popular. Some mobile communication devices (e.g., Smartphones) offer computing environments that are similar to that provided by a Personal Computer (PC). As such, a Smartphone can effectively provide a complete operating system as a standardized interface and platform for application developers. Given the popularity of mobile communication devices, telecommunication is discussed in greater detail below.

Generally, telecommunication refers to assisted transmission of signals over a distance for the purpose of communication. In earlier times, this may have involved the use of smoke signals, drums, semaphore or heliograph. In modern times, telecommunication typically involves the use of electronic transmitters such as the telephone, television, radio or computer. Early inventors in the field of telecommunication include Alexander Graham Bell, Guglielmo Marconi and John Logie Baird. Telecommunication is an important part of the world economy and the telecommunication industry's revenue is placed at just under 3 percent of the gross world product.

Conventional telephones have been in use for many years. The first telephones had no network but were in private use, wired together in pairs. Users who wanted to talk to different people had as many telephones as necessary for the purpose. Typically, a person who wished to speak, whistled into the transmitter until the other party heard. Shortly thereafter, a bell was added for signaling, and then a switch hook, and telephones took advantage of the exchange principle already employed in telegraph networks. Each telephone was wired to a local telephone exchange, and the exchanges were wired together with trunks. Networks were connected together in a hierarchical manner until they spanned cities, countries, continents and oceans. This can be considered the beginning of the public switched telephone network (PSTN) though the term was unknown for many decades.

Public switched telephone network (PSTN) is the network of the world's public circuit-switched telephone networks, in much the same way that the Internet is the network of the world's public IP-based packet-switched networks. Originally a network of fixed-line analog telephone systems, the PSTN is now almost entirely digital, and now includes mobile as well as fixed telephones. The PSTN is largely governed by technical standards created by the ITU-T, and uses E.163/E.164 addresses (known more commonly as telephone numbers) for addressing.

More recently, wireless networks have been developed. While the term wireless network may technically be used to refer to any type of network that is wireless, the term is often commonly used to refer to a telecommunications network whose interconnections between nodes is implemented without the use of wires, such as a computer network (which is a type of communications network). Wireless telecommunications networks can, for example, be implemented with some type of remote information transmission system that uses electromagnetic waves, such as radio waves, for the carrier and this implementation usually takes place at the physical level or "layer" of the network (e.g., the Physical Layer of the OSI Model). One type of wireless network is a WLAN or Wireless Local Area Network. Similar to other wireless devices, it uses radio instead of wires to transmit data back and forth between computers on the same network. Wi-Fi is a commonly used wireless network in computer systems which enable connection to the internet or other machines that have Wi-Fi functionalities. Wi-Fi networks broadcast radio waves that can be picked up by Wi-Fi receivers that are attached to different computers or mobile phones. Fixed wireless data is a type of wireless data network that can be used to connect two or more buildings together in order to extend or share the network bandwidth without physically wiring the buildings together. Wireless MAN is another type of wireless network that connects several Wireless LANs.

Today, several mobile networks are in use. One example is the Global System for Mobile Communications (GSM) which is divided into three major systems which are the switching system, the base station system, and the operation and support system (Global System for Mobile Communication (GSM)). A cell phone can connect to the base system station which then connects to the operation and support station; it can then connect to the switching station where the call is transferred where it needs to go (Global System for Mobile Communication (GSM)). This is used for cellular phones and common standard for a majority of cellular providers. Personal Communications Service (PCS): PCS is a radio band that can be used by mobile phones in North America. Sprint happened to be the first service to set up a PCS. Digital Advanced Mobile Phone Service (D-AMPS) is an upgraded version of AMPS but it may be phased out as the newer GSM networks are replacing the older system.

Yet another example is the General Packet Radio Service (GPRS) which is a Mobile Data Service available to users of Global System for Mobile Communications (GSM) and IS-136 mobile phones. GPRS data transfer is typically charged per kilobyte of transferred data, while data communication via traditional circuit switching is billed per minute of connection time, independent of whether the user has actually transferred data or has been in an idle state. GPRS can be used for services such as Wireless Application Protocol (WAP) access, Short Message Service (SMS), Multimedia Messaging Service (MMS), and for Internet communication services such as email and World Wide Web access. 2G cellular systems combined with GPRS is often described as "2.5G", that is, a technology between the second (2G) and third (3G) generations of mobile telephony. It provides moderate speed data transfer, by using unused Time Division Multiple Access (TDMA) channels in, for example, the GSM system. Originally there was some thought to extend GPRS to cover other standards, but instead those networks are being converted to use the GSM standard, so that GSM is the only kind of network where GPRS is in use. GPRS is integrated into GSM Release 97 and newer releases. It was originally standardized by European Telecommunications Standards Institute (ETSI), but now by the 3rd Generation Partnership Project (3GPP). W-CDMA (Wideband Code Division Multiple Access) is a type of 3G cellular network. W-CDMA is the higher speed transmission protocol used in the Japanese FOMA system and in the UMTS system, a third generation follow-on to the 2G GSM networks deployed worldwide. More technically, W-CDMA is a wideband spread-spectrum mobile air interface that utilizes the direct sequence Code Division Multiple Access signaling method (or CDMA) to achieve higher speeds and support more users compared to the implementation of time division multiplexing (TDMA) used by 2G GSM networks. It should be noted that SMS can be supported by GSM and MMS can be supported by 2.5G/3G networks.

Generally, a mobile phone or cell phone can be a long-range, portable electronic device used for mobile communication. In addition to the standard voice function of a telephone, current mobile phones can support many additional services such as SMS for text messaging, email, packet switching for access to the Internet, and MMS for sending and receiving photos and video. Most current mobile phones connect to a cellular network of base stations (cell sites), which is in turn interconnected to the public switched telephone network (PSTN) (one exception is satellite phones).

The Short Message Service (SMS), often called text messaging, is a means of sending short messages to and from mobile phones. SMS was originally defined as part of the GSM series of standards in 1985 as a means of sending messages of up to 160 characters, to and from Global System for Mobile communications (GSM) mobile handsets. Since then, support for the service has expanded to include alternative mobile standards such as ANSI CDMA networks and Digital AMPS, satellite and landline networks. Most SMS messages are mobile-to-mobile text messages, though the standard supports other types of broadcast messaging as well. The term SMS is frequently used in a non-technical sense to refer to the text messages themselves, particularly in non-English-speaking European countries where the GSM system is well-established.

Multimedia Messaging Service (MMS) is a relatively more modern standard for telephony messaging systems that allows sending messages that include multimedia objects (images, audio, video, rich text) and not just text as in Short Message Service (SMS). It can be deployed in cellular networks along with other messaging systems like SMS, Mobile Instant Messaging and Mobile E-mal. Its main standardization effort is done by 3GPP, 3GPP2 and Ope Mobile Alliance (OMA).

The popularity of computing systems, especially mobile communication devices is evidenced by their ever increasing use in everyday life. Accordingly, improved techniques for protecting computing devices would be useful. In particular, improved techniques for protecting mobile communication devices would be extremely useful.

SUMMARY OF THE INVENTION

Broadly speaking, the invention relates to techniques for protecting computing systems. More particularly, techniques for detecting unauthorized use (e.g., malicious attacks) of computing systems (e.g., computing devices) are disclosed. It will be appreciated that unauthorized use can be detected based on the patterns of use of the computing systems (e.g., behavioral patterns of use typically associated with a human being and interactions with a device).

In accordance with one aspect of the invention, acceptable behavioral pattern data is generated for a computing system by monitoring the use of a support system (e.g., an operating system, a virtual environment) operating on the computing system. In one embodiment, one or more system support provider components of the support system (e.g., system calls, device drivers) are monitored in order to generate the acceptable behavioral pattern data in a form which effectively defines an acceptable pattern of use (usage pattern) for the monitored system support provider components, thereby allowing detection of unauthorized use of the computing system by detecting any deviation from the acceptable pattern of use of the monitored system support provider components.

It will be appreciated that the techniques allow detection of malicious software regardless of the process and security context used. As such, various types of malicious attacks can be identified by detecting any deviation from the acceptable pattern of use. This means that malicious attacks can be detected based on the exhibited behavior of use even if the malicious attack is disguised under the veil of an authorized process (e.g., a high jacked process). It will also be appreciated that not all of the system support provider components (e.g., system calls) need to be monitored. In accordance with another aspect of the invention, only the system support provider components that are likely to be targeted and/or used by malicious software can be monitored. In one exemplarily embodiment, only a select number of designated system calls are monitored for a mobile communication device (e.g., Smartphone). The designated system calls can, for example, be selected based on the likelihood of use by malicious software. For some applications and/or devices (e.g., messaging for mobile devices) a number of critical applications can be selected (e.g., critical or basic system calls, such as, those required for opening files and communication mechanisms). Given that a relatively limited number of system calls operate on mobile communication devices and the prevalence of some applications (e.g., messaging), it will be appreciated that a relatively small number of system calls need to be monitored for mobile communication devices. By way of example, only the system calls that eventually operate on a socket, an addressbook, a bluetooth device, a wifi interface, and a GSM/GPRS modem device in smartphones need to be monitored and authenticated because these system resources are usually the targets of malware. As such, the invention is especially useful for protecting mobile communication devices, even though the techniques of the invention are useful for detection of unauthorized use in any computing system as the invention is based on monitoring support systems (e.g., operating systems) that are generally provided by most computing systems.

The invention can be implemented in numerous ways, including, for example, a method, an apparatus, a computer readable medium, and a computing system (e.g., a computing device). Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
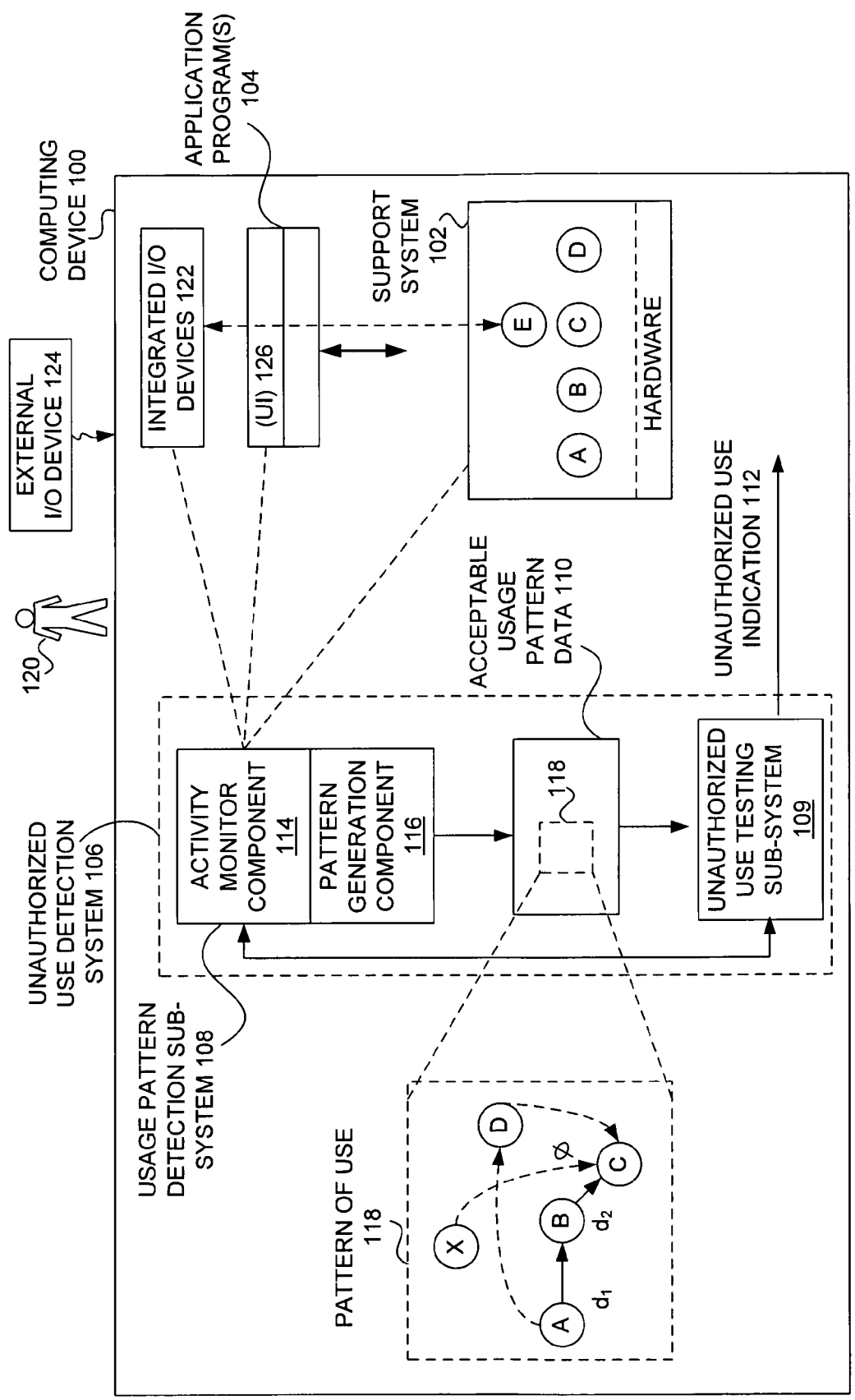
FIG. 1 depicts a computing device in accordance with one embodiment of the invention.

As noted in the background section, mobile devices are becoming increasingly more popular. Today, wireless networks and mobile communication devices (e.g., Smartphones, cell phones, Personal Digital Assistants) are especially popular. Unfortunately, however, partly because of this popularity, more and more malicious attacks are being directed to wireless networks and mobile communication devices. In addition, recent developments, including relatively new services (e.g., email, file transfer and messaging), and use of common software platforms (e.g., Symbian, Embedded Linux, and Windows CE operating systems) has made mobile communication devices relatively more exposed to malicious attacks. The exposure to malicious attacks could become worse as the wireless networks and mobile communication devices are evolving rapidly. Today, wireless and/or portable communication devices (e.g., cell phones, SmartPhones) can offer similar functionality as that more traditionally offered by Personal Computers (PCs). As a result, wireless and/or portable communication devices are likely to face similar security problems (e.g., worms, viruses) as those encountered in more traditional computing environments.

Examples of the most notorious threats to cell phones include the Skull, Cabir, and Mabir worms which have targeted the Symbian operating systems. Generally, an MMS-based worm can start attacking initial targets (hit-list) from the network. Each infected phone can scan its contact list and randomly pick up members to deliver a malicious attack in the form of a message. A person can trust an incoming message due to its attractive title or seemingly familiar source and activate the attached file and unwittingly get a phone infected. The infected phone can in turn get other phones infected, and so on. In contrast, a Blue-tooth based worm can take control of a victim phone's Blue-tooth interface and continuously scan for other Blue-tooth-enabled phones within its range. Once a new target has been detected, the worm can effectively connect to other devices and transfers a malicious message to them, and so on.

Taking the cell phone as an example, an active cell phone typically has two security states: susceptible and infected. A susceptible cell phone is not completely protected against worms and may get infected when exposed to a specific worm (e.g., CommWarrior). An infected cell phone can return back to the susceptible state when the user launches a protection (e.g., the CommWarrior patch from F-Secure or Symantec) partly because the cell phone is susceptible to other worm threats. Malware has many other undesirable affects including compromising the privacy of the users.

It will be appreciated that attacking strategies used by malicious software ("malware") can be divided into two different categories based on whether a new process is created. In category one (I) attacks, a new process can be used typically with a new security context in order to launch a malicious programs. In contrast, in category two (II) attacks, a new process is not created. Instead, malware can effectively take over an existing legitimate (or authorized) process (or "hijack" a legitimate process) in order to execute its malicious code within legitimate security domain of the process that it has hijacked. Those skilled in the art will appreciate that an automated malware can adopts this strategy through exploiting software vulnerabilities, such as, buffer-overrun, in order to launch malicious attacks. The category two (II) attack is relatively more difficult to detect because it can effectively disguise itself as a legitimate (or authorized process). In addition, category two (II) attacks do not require a human to trigger their malicious code and could cause extremely serious harm to a mobile device.

In view of the foregoing, improved techniques for protecting computing devices against malicious software are needed.

Accordingly, the invention pertains to techniques for detecting unauthorized use (e.g., malicious attacks) of computing systems (e.g., computing devices). More particularly, unauthorized use can be detected based on the patterns of use of the computing systems (e.g., behavioral patterns of use typically associated with a human being).

In accordance with one aspect of the invention, acceptable behavioral pattern data is generated for a computing system by monitoring the use of a support system (e.g., an operating system, a virtual environment) operating on the computing system. In one embodiment, one or more system support provider components of the support system (e.g., system calls, device drivers) are monitored in order to generate the acceptable behavioral pattern data in a form which effectively defines an acceptable pattern of use (usage pattern) for the monitored system support provider components, thereby allowing detection of unauthorized use of the computing system by detecting any deviation from the acceptable pattern of use of the monitored system support provider components.

It will be appreciated that the techniques of the invention allow detection of malicious software regardless of the process and security context used. As such, both category I and II malicious attacks can be detected by detecting any deviation from the acceptable pattern of use. This means that malicious attacks can be detected based on the exhibited behavior of use even if the malicious attack is disguised under the veil of an authorized process (e.g., a high jacked process).

It will also be appreciated that not all of the system support provider components (e.g., system calls) need to be monitored. In accordance with another aspect of the invention, only one or more system support provider components that are likely to be targeted and/or used by malicious software can be monitored. In one exemplarily embodiment, only a select number of designated system calls are monitored for a mobile communication device (e.g., Smartphone) that operates an operating system. The designated system calls can be selected based on the likelihood of use by malicious software. For some applications and/or devices (e.g., messaging for mobile devices) a number of critical applications can be selected (e.g., critical or basic system calls, such as, those required for opening files and communication mechanisms). Given that a relatively limited number of system calls operate on mobile communication devices and the prevalence of some applications (e.g., messaging), it will be appreciated that a relatively small number of system calls need to be monitored for mobile communication devices. As such, the invention is especially useful for protecting mobile communication devices, even though the techniques of the invention are useful for detection of unauthorized use in any computing system as the invention is based on monitoring support systems (e.g., operating systems) that are generally provided by most computing systems.

The invention is especially useful for cell phones for many reasons. Cell-phone GUI's are generally designed to be very intuitive and simple to enable comfortable and convenient operations. Hence, user input behavior in this context is relatively more predicable. Cell phone keypads generally have less buttons than normal PC keyboards (e.g., Nokia Communicator 9300 phone has a "full keyboard" with 58 character keys, whereas a normal PC keyboard usually has over 100 various keys). Most mobile phones today have a keypad with less than 25 keys and are therefore easier to monitor in accordance with the invention. Some cell phones support touchscreens which allow users to input data in flexible ways and allow virtual keyboard and handwriting recognition. In addition, cell phone use is generally more personal and private than other computing devices (e.g., servers, personal computers). In view of these factors, a users' operational pattern of use is especially meaningful and useful in the context of cell phone usage.

Embodiments of these aspects of the invention are discussed below with reference to FIGS. 1-9. However, those skilled in the art will readily appreciate that the detailed description given herein with respect to these figures is for explanatory purposes as the invention extends beyond these limited embodiments.

FIG. 1 depicts a computing device 100 in accordance with one embodiment of the invention. Referring to FIG. 1, the computing device 100 effectively provides a support system 102 capable of supporting one or more application program(s) 104. Generally, the support system 102 allows the application program(s) 104 to access services and/or resources in order to perform, for example, a variety of tasks. Referring back to FIG. 1, a plurality of system support provider components A, B, C and D are depicted which can each provide one or more services and/or resources to the application program(s) 104. Those skilled in the art will readily appreciate that the support system 102, can, for example, be provided as an operating system or a virtual computing environment that effectively supports the one or more application program(s) 104. In particular, in case of an operating system, the system support provider components A, B, C and D can be system calls which can be effectively called by the one or more application programs 104.

In any case, the computing device 100 can be effectively configured to monitor the support system 102 to determine whether an unauthorized entity (e.g., worm, virus) is attempting to use the device. More particularly, an unauthorized use detection system 106 can be provided to detect any unauthorized use of the computing device 100 by monitoring the system support provider components A, B, C and D. By way of example, the system support provider components A, B, C and D can be one or more keyboard/touch screen inputs which are effectively invoked by user applications.

Referring again to FIG. 1, the unauthorized use detection system 106 is depicted effectively to include a usage pattern detection sub-system 108 and unauthorized use detection system 109. The usage pattern detection sub-system 108 generates acceptable usage pattern data 110 which is effectively used by the authorized use testing sub-system 109 to detect any unauthorized use of the computing device 100. It will be appreciated that the acceptable usage pattern data 110 can effectively define an acceptable pattern of use for using the system support provider components A, B, C and D of the support system 102, thereby allowing the unauthorized use testing sub-system 109 to detect any deviation from the defined acceptable pattern of use and consequently generate an unauthorized use indication 112. The usage pattern detection sub-system 108 generates the acceptable usage pattern data 110 based on the monitoring of the support system 102. More particularly, an activity Monitor component 114 can effectively detect when one of the plurality of the system support provider components A, B, C and D are being used and gather information regarding their use. The information gathered by the activity monitor component 114 can be used by the pattern generation component 116 to establish a pattern of use of the support system 102. By way of example, the acceptable usage pattern data 110 can include a pattern of use 118 which effectively defines pattern of use for the system support provider components A, B and C (e.g., a manner in which a plurality of system provider components have been used). As such, the pattern of use 118 can, for example, indicate that the system support provider component B has been used immediately after the system support provider component A, and so on. The pattern of use 118 can effectively define a pattern of usage (or a sequence ABC) in situations where there may be one or more other possible patterns of use (e.g., A, D, C) thereby effectively establishing a behavioral pattern for use of the support system 102. As such, the pattern of use data 108 can effectively define all possible patterns of use and patterns that are more frequently used. By way of example, the pattern of use data 108 can effectively indicate that there are only two possible ways of using the system support provider component C and any other patterns of use can be identified as an unauthorized use of the system support provider component C.

The authorized use testing sub-system 109 can use the activity monitor component 114 to obtain a current pattern of use of a system support provider component. This current pattern of use can be effectively compared to the acceptable pattern of use defined by the acceptable usage pattern data 110. By way of example, when the activity monitor component 114 detects that the system support provider component C is being used during the operation of the computing device 100, the unauthorized use testing sub-system 109 can effectively obtain pattern use data 108 associated with the system support provider component C so that the acceptable pattern of use for the system support provider component C can be compared to its current use. As such, an unusual pattern of use (e.g., A→D→C) can be detected and suspected as well as a pattern of use which is known not to be permissible (e.g., X→C). It will be appreciated that it would be extremely difficult for malware to effectively learn and simulate the pattern of use of a device especially when the patterns are based on human behavior.

It will also be appreciated that in addition to the patterns of use of the support system 102, transition data can be considered. Typically, transition data is associated with transitioning to, from, and/or between the system support provider components A, B, C and D which can be monitored by the activity monitor component 114 and provided as the acceptable usage pattern data 110. Transition data can, for example, correspond to input/output data associated with a human 120 interacting with the computing device 100 via integrated I/O device(s) 122 and/or external or plugged in I/O device(s) 124. The human 120 can, for example, effectively interact with the one or more application programs 104 via a User Interface (UI) 126 that can be provided separately and/or as a part of the application program(s) 104. Those skilled in the art will appreciate that the activity monitor component 114 can, for example, capture various variables (e.g., time, pressure) associated with the input provided by the human 120 and/or output displayed (e.g., menus, windows) for the human 120.

The activity monitor component 114 can, for example, monitor the support system provider component E associated with the integrated I/O devices 122 (e.g., an device driver) and/or directly monitor the integrated I/O devices 122 and/or User Interface (UI) 126. In any case, the transition data (d1 and d2) can also serve as a variable too for establishing an acceptable pattern of use and as such provide valuable insight to normal and acceptable pattern of use which can effectively assist in detecting authorized use of the computing device 100. Those skilled in the art will appreciate that a pattern of use can include both transitions of state (e.g., program flow oriented) and user operational patters (e.g., time, duration, pressure and positioning of the input). Given the prevalence of I/O devices and their use, techniques for capturing input/output transition data will be discussed in greater detail below.

Figure 2A:
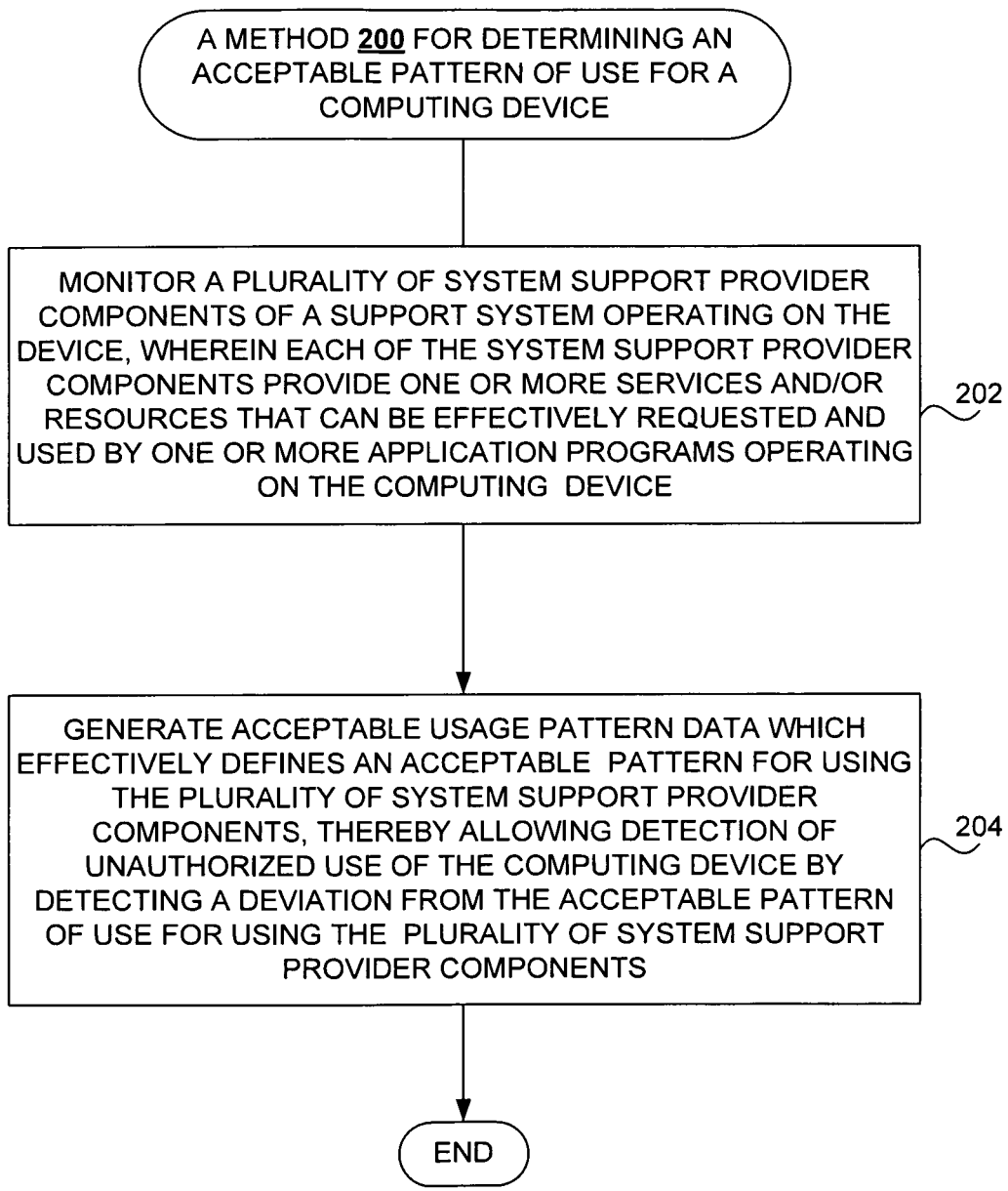
FIG. 2A depicts a method for determining an acceptable pattern of use for a computing device in accordance with one embodiment of the invention.

FIG. 2A depicts a method 200 for determining an acceptable pattern of use for a computing device in accordance with one embodiment of the invention. The method 200 can, for example, be used by the computing device 100 depicted in FIG. 1. Initially, a plurality of system support provider components are monitored (202). The system support provider components are part of the support system operating on the computing device when the device is active and/or being used. Each of the system support provider components provides one or more services and/or resources. The services and/or resources can be effectively requested and used by one or more application programs operating on the computing device. Based on the monitoring (202) of the system support provider components, acceptable usage pattern data is generated (204). It will be appreciated that the acceptable usage pattern data can effectively define an acceptable pattern for using the plurality of the system support provider components which are being monitored (202), thereby allowing detection of unauthorized use of the computing device by detecting any deviation from the acceptable pattern of use defined by the acceptable usage pattern data for using the plurality of the system support provider components. The method 200 ends after the acceptable usage pattern data is generated (204).

Figure 2B:
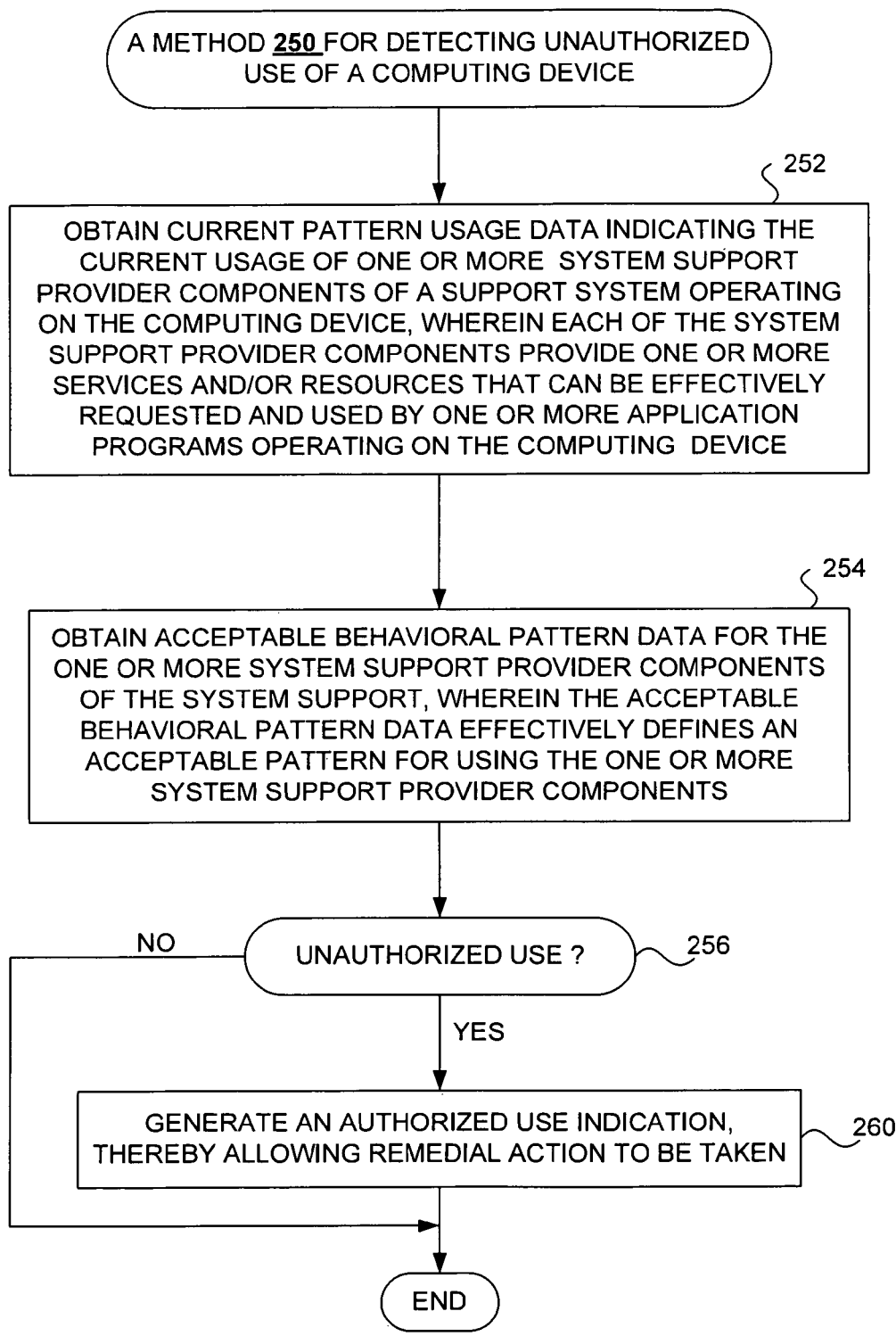
FIG. 2B depicts a method for detecting unauthorized use of a computing device in accordance with one embodiment of the invention.

FIG. 2B depicts a method 250 for detecting unauthorized use of a computing device in accordance with one embodiment of the invention. The method 250 can, for example, be used by the computing device 100 depicted in FIG. 1. Initially, current pattern usage data is obtained (252). It will be appreciated that the current pattern usage data can indicate the current usage of one or more system support provider components of a support system operating on the computing device. In other words, the current pattern usage data can effectively describe the manner in which one or more system support provider components are being currently requested and/or used. Again, it should be noted that each of the system support provider components can support one or more services and/or resources that can be effectively requested and used by one or more application programs operating on the computing device.

In addition to the current usage pattern data, acceptable behavioral pattern data is obtained (254). Typically, the acceptable behavioral pattern data pertains to one or more system support provider components of the support system. As such, the acceptable behavioral pattern data can effectively define an acceptable pattern for using one or more system support provider components of the support system which are currently in use (e.g., being requested by an application program), thereby allowing the acceptable pattern to be compared to the current pattern of use indicated by the current pattern usage data. Accordingly, based on this comparison, it is determined (256) whether unauthorized use of the computing device is detected. If unauthorized use is not detected (256) (i.e., use is authorized), the method 250 ends. However, if unauthorized use is detected (256) based on the acceptable behavioral pattern data, an unauthorized usage indication is generated (260). The unauthorized usage indication allows remedial action to be taken (e.g., an application program can be denied access to the one or more system support provider components, the computing device can be locked, a warning can be issued, unauthorized use can be logged for analysis). The method 250 ends after the unauthorized usage indication is generated (260).

Figure 3:
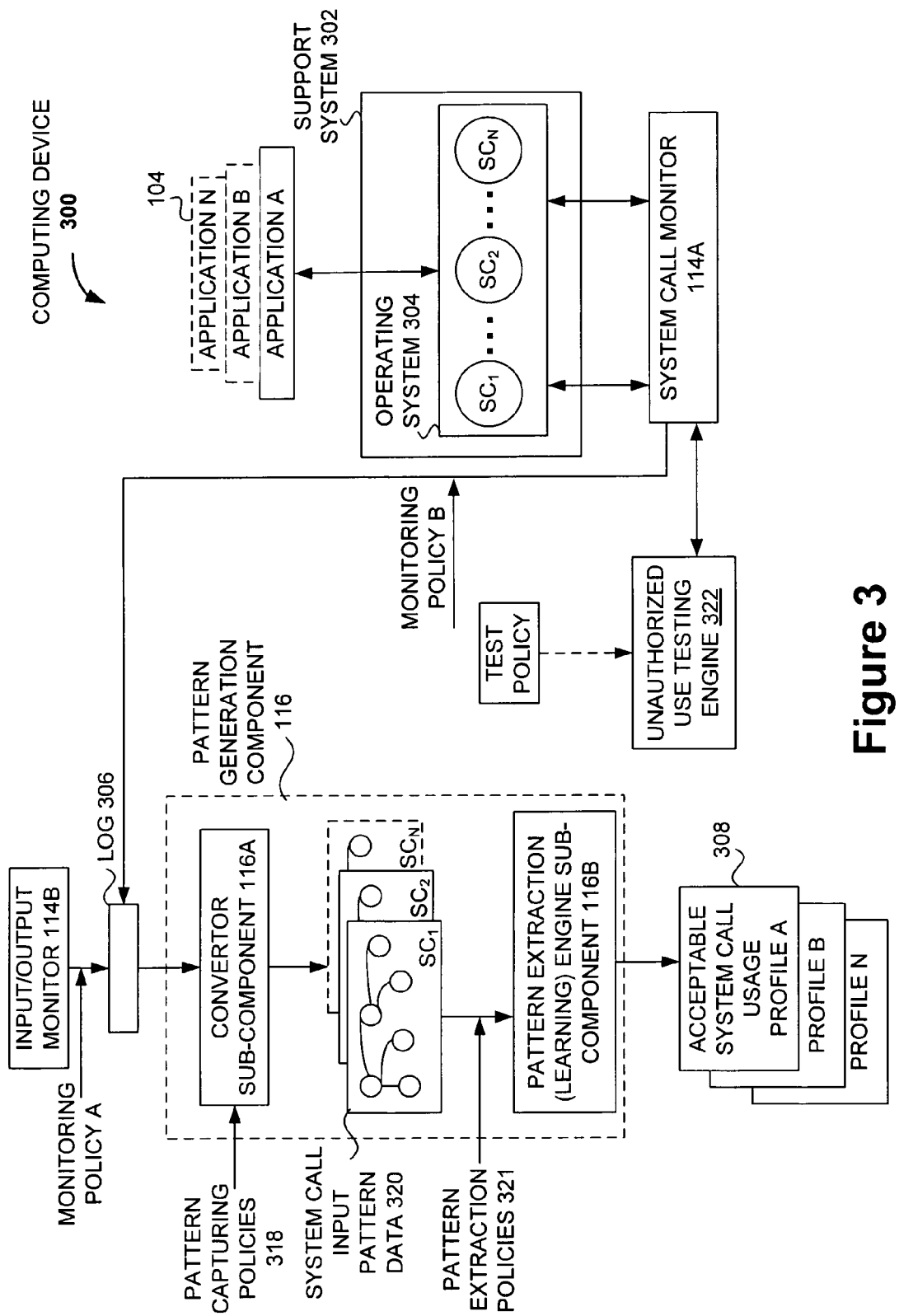
FIG. 3 depicts a computing device in accordance with one embodiment of the invention.

FIG. 3 depicts a computing device 300 in accordance with one embodiment of the invention. Referring to FIG. 3, a support system 302 effectively provides an operating system 304. Those skilled in the art will readily appreciate that the operating system 304 can provide a plurality of system calls $SC_1 \ldots SC_n$, each providing one or more resources and/or services. As such, one or more application programs 104 can make a system call to request and subsequently receive one or more resources and/or services provided by the operating system 304. The system calls $SC_1 \ldots SC_n$ can, for example, include a call for opening a file (e.g., f-open) or opening a communication mechanism (e.g., socket). To monitor the system call activity, a system call monitor 114A is effectively provided. The system call monitor 114A can effectively detect that one or more of the system calls $SC_1 \ldots SC_2$ have been called and capture the call event and store it in the log 306. In addition to the system call monitor 114A, another monitoring computing, namely, an input/output monitor 114B can effectively monitor the input/output activity associated with the system calls $SC_1 \ldots SC_2$ including any input and/or output activity associated with transitioning to, from, and/or between one or more of the system calls $SC_1 \ldots SC_n$ as they are being called by one or more application programs 104.

In general, the system call monitor 114A and input/output monitor 114B can capture information in accordance with monitoring policies A and B which can, among other things, select one or more system calls for monitoring, as well as selecting particular types of input and/or output associated with them for monitoring. In any case, log 306 can include captured information regarding the system calls called by the application program(s) 104 and provide additional input/output information associated with the system calls made. Log 306 can be effectively used by a pattern generation component 116 to generate one or more system call usage profiles 308. Referring to FIG. 3, the convertor sub-component 116A can effectively convert the captured information stored in the log 306 into system call input pattern data 320. Those skilled in the art will readily appreciate that the convertor sub-component 116A can use one or more pattern capturing policies 318 in order to generate system call input pattern data 320 in a form that allows extraction of one or more behavioral patterns for calling the system calls $SC_1 \ldots SC_n$ based on one or more pattern extraction techniques and/or policies 321. The system call input pattern data 320 can, for example, be provided as system call representations (e.g., graphs). The pattern extraction (learning engine) sub-component 116B can extract one or more behavioral patterns as acceptable system call usage profiles 308. The acceptable system call usage profiles 308 can be used by an unauthorized use testing engine 322 to detect unauthorized system calls. More particularly, the authorized use testing engine 122 can use the system call monitor 114A and input/output monitor 114B to effectively obtain a current system call pattern as well as input/output data provided in connection with the current system call pattern. In effect, when the system call monitor 114A detects that a particular system call has been called by an application program 104, the unauthorized use testing engine 322 can obtain an acceptable system call usage profile 308 associated with the called system so that it can compare the current call pattern of a particular system call (e.g., $SC_2$) with an acceptable system call usage pattern provided by an associated acceptable system call usage profile (e.g., acceptable system call usage profile B). As such, the authorized usage testing engine 122 can effectively detect that an unauthorized system call has been made when the current system call pattern used to call the system call is not within an acceptable range of the acceptable system call usage profile provided for that system call.

It will be appreciated that not all system calls provided by an operating systems need to be monitored. As such, a plurality of system calls can be selected for monitoring. The selected system calls can, for example, represent a plurality of system calls that are likely to be used by unauthorized entities (e.g., viruses and worms). In particular, it will be appreciated that for mobile and wireless devices, a relatively small number of system calls need to be monitored in comparison to the PC computing environments where a larger number of system calls are generally used. Furthermore, a number of system calls are more prevalent on mobile devices given the nature of the applications frequently used (e.g., messaging applications are often used on mobile devices). Therefore, it will be appreciated that the techniques described above are especially useful for mobile devices and techniques for detecting authorized use of mobile devices will be described in even greater detail below.

Figure 4A:
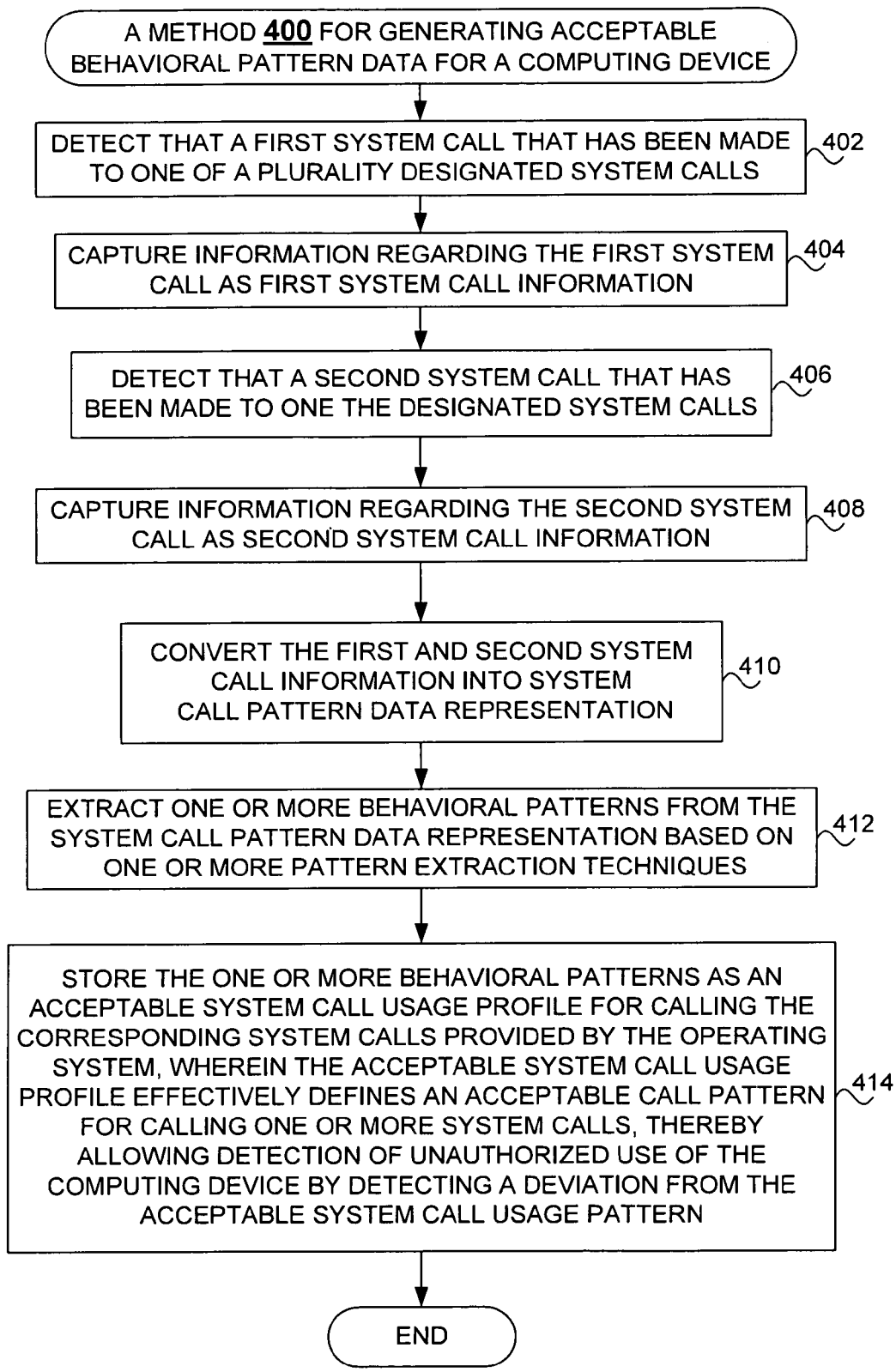
FIG. 4A depicts a method for generating acceptable behavioral pattern data for a computing device in accordance with one embodiment of the invention.

FIG. 4A depicts a method 400 for generating acceptable behavioral pattern data for a computing device in accordance with one embodiment of the invention. Initially, a first system call is detected (402). The first system call is a system call made to one of a plurality of designated system calls that are being effectively monitored. Next, information regarding the first system call is captured (404) as first system call information. Thereafter, a second system call is detected (406). Similar to the first system call, the second system call is a system call made to one of a plurality of designated system calls that are being effectively monitored. As such, the information regarding the second system call is captured (408) as second system call information. Thereafter, the first and second system call information are converted (410) into system call pattern data representation (e.g., system call graphs). The converting (410) can, for example, include filtering and preprocessing of the first and second call information. The converting (410) can, for example, be made based on one or more pattern capturing policies to effectively convert the captured information into a form that allows pattern extraction based on one or more pattern extraction techniques. Accordingly, one or more behavioral patterns are extracted (412) from the system call pattern data representation based on one or more pattern extraction techniques generally known to these skilled in the art.

Finally, the one or more extracted behavioral patterns are stored (414) as an acceptable system call usage profile for calling the one or more system calls that corresponds to the first and second system calls. Typically, the first and second system calls are made to two different system calls. However, it is possible to detect two calls to the same system call and generate the system call usage profile accordingly. It should be noted that the system call usage profile can also be generated based on a single system call, but typically it is desirable to monitor a plurality of system calls. In any case, the acceptable system call usage profile effectively defines acceptable call pattern for calling one or more system calls, thereby allowing detection of unauthorized use of the computing device by detecting any deviation from the acceptable system call usage pattern. The method 400 ends after the acceptable system call usage profile is stored (414).

Figure 4B:
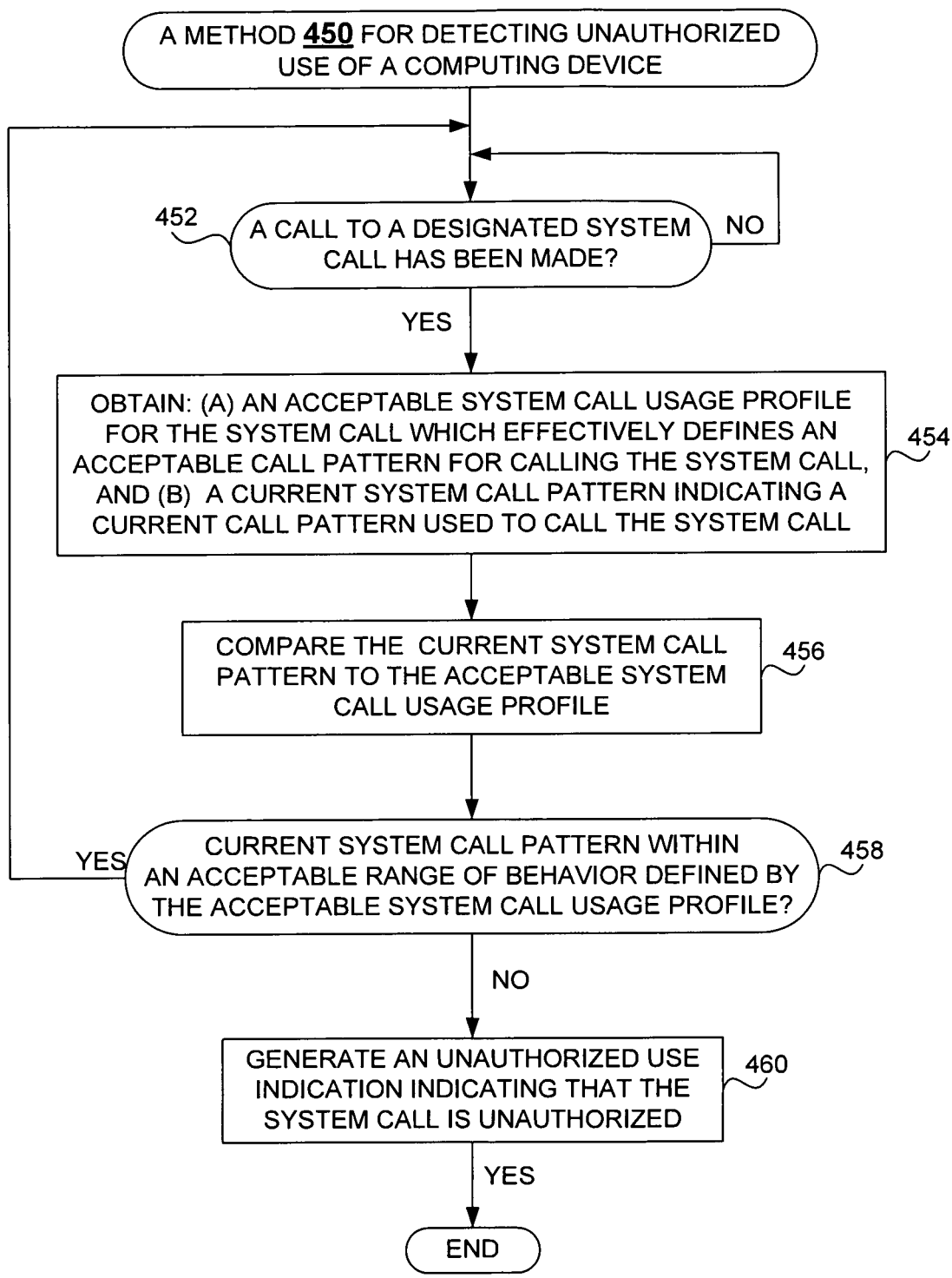
FIG. 4B depicts a method for detecting unauthorized use of a computing device in accordance with one embodiment of the invention.

FIG. 4B depicts a method 450 for detecting unauthorized use of a computing device in accordance with one embodiment of the invention. In effect, the method 450 waits to detect that a system call has been made to one of a plurality of designated (i.e., monitored) system calls. If a call to a designated system call has been detected (452), an acceptable system call usage profile and a current system call pattern for the system call are obtained (454). The acceptable system call usage profile is associated with the system call that has been called and effectively defines an acceptable call pattern (or behavioral pattern) for calling that system call. In contrast, the current system call pattern indicates the current call patterns used to call the system call. Accordingly, the current system call pattern is compared to the acceptable system call usage profile (456) to effectively determine (458) whether the current system call pattern is within an acceptable range of the acceptable system call usage profile. In other words, it is effectively determined (458) whether the current pattern used to call the system call is within an acceptable range of what is considered to be an acceptable pattern for calling the system call. If it is determined (458) that the current system call pattern is within the acceptable range of behavior defined by the acceptable system call usage profile, the method 450 proceeds to detect whether another system call has been made to one of the designated system calls which are being effectively monitored. On the other hand, if it is determined (458) that the current system call pattern is not within the acceptable range of the acceptable system call usage profile, an unauthorized use indication is generated (460) that can effectively indicate that a system call is unauthorized, thereby allowing remedial action to be taken. The method 450 ends after an unauthorized use indication is generated (460).

In wireless and/or mobile devices, prevalent operations (e.g., messaging) generally involve a series of user interactions via a Graphical user Interface (GUI). For example, to compose a MMS message, a user can bring out an "edit" menu on a screen and input a message by interacting with a Graphical user Interface (GUI), for example, by touching a keypad and viewing the message as it being typed on a display the LCD display. It will be appreciated that the GUI interactions can be effectively captured by input/output devices (e.g., a keyboard, a display) and/or by various operating support components (e.g., keyboard and displays drivers are typically in the kernel space). In addition, a messaging process typically needs to make a sequence of key system calls in order to access phone resources (e.g., file, socket) and acquire system services required for effective delivery of the message to the recipient.

By way of example, to search for an email address or a phone number of a recipient, a messaging process can the system call: "open("address book", O RDONLY)" to access a contact list in a phone address book. In order to send an email through a Wi-Fi interface, a "smtpclient" process can make the system call: "socket (AF_INET, SOCK STREAM)" to create a stream socket in order to communicate with the SMTP server. As another example, to deliver a SMS/MMS message, a "mmsclient" process makes the system call: "fd=open ("/dev/ttyS0", O RDWR)" and writes the message to a serial device "ttyS0" (phone modem) using another system call, namely: "write (fd, message, length)". The modem receives the message and eventually delivers it to an air interface.

Figure 5:
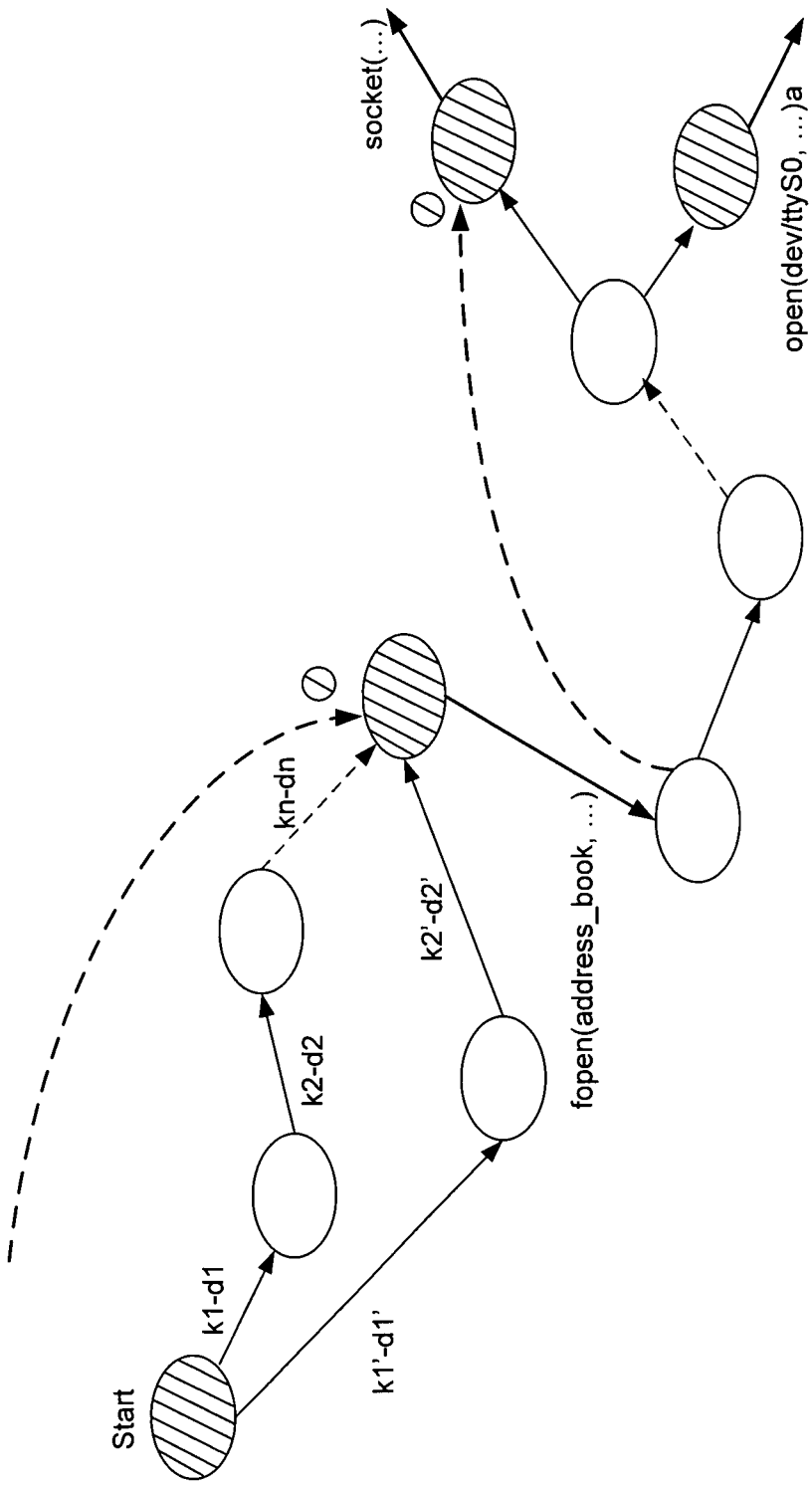
FIG. 5 depicts a partial behavior-graph of email/MMS messaging process in accordance with one embodiment of the invention.

To further elaborate, FIG. 5 depicts a partial behavior-graph of email/MMS messaging process in accordance with one embodiment of the invention. Referring to FIG. 5, between a pair of system calls and a starting state, a series of keyboard-display interactions (e.g., K1-D1) can be captured. It should be noted that the system calls depicted in FIG. 5 can represent critical or important monitoring points in a kernel as a pair of system call that are required by malicious applications and/or processes in order to attack a system. In other words, it will be appreciated that a number of critical or key system calls can be selected for monitoring and a series of keyboard-display interactions corresponding to the system calls can be captured.

To examine the difference between a normal or authorized processes and unauthorized or malicious processes, the pattern or behavior of the processes with respect to a number of key or critical system calls and their associated input/input data can be examined. For example, the pattern or behavior of the processes between two key or critical system calls: open( ) and socket( ) can be considered, where the paths: "(start) →open( )", "open( )→socket( )" are monitored to establish an expected (or normal) behavioral pattern. If a process deviates from an expected (or normal) behavioral pattern including the GUI interactions, it may be suspected and its request to access important or critical system resources can be questioned and/ or ultimately denied. In effect, the behavior of the process can be authenticated before access to key or critical system calls is granted.

It will be appreciated that an unauthorized use (or malware) detection system for a mobile wireless device (e.g., a cell phone) can include a behavior analyzer, a learning engine, a system call monitor, and a malware detection engine. To detect malware, a user's behavior during a period of use for particular application (e.g., messaging) can be monitored. Initially, a behavior analyzer can, for example, collect all the event logs of keyboard operations and LCD displays and correlate each input/output event pair by analyzing their time stamps in the logs. These event pairs can reflect intermediate process states. For example, a user can follow a menu to input the recipient's phone number either through retrieving the most recently received calls or through looking up the phone address book. In this case, the behavior analyzer can collect all the raw input/output pairs and use a policy file to construct a behavior-based graph which reflects the intermediate process states towards a key system call. The behavior analyzer can, for example, use keypad events to generate a behavior graph "Gopen" for a system call open( ). It should be noted that the policy file can be effectively dynamically adjusted as various applications are being used on a device. Furthermore, the policy file can apply a first level of sanitization and/or filtering on the raw and effectively control the granularity of the process states to be reflected in the graph. In this way, a set of raw GUI events can be converted to a meaningful data set which can characterize a process behavior with respect to one or more system calls an their associated input/output.

Next, the learning engine can extract user-behavior features from the behavior graph by effectively observing the key/display event pairs in the behavior graph and extracting unique features including both the user's personal behavioral input/output patterns (e.g., the time between keystrokes, the keystroke duration) and the sequence of process state transitions. For example, a user may typically use navigation keys to choose an icon after opening a phone book menu. Therefore, a rule for the key sequence starting with $K_{menu}$ can be extracted as: "$K_{menu} \rightarrow K_{navi} \rightarrow K_{navi} \rightarrow \ldots K_{enter}$." After learning the operational patterns and state transition rules, the learning engine can encode the learned parameters by hashing them to the kernel where it can be securely stored as a user profile. It should be noted that a profile can be generated for each of several users that may use a device.

To detect a malicious process, the detection engine that operates in the kernel can monitor critical or key system calls. The detection engine ensures that a critical or key system call is being called in accordance with the policy defined by the user profile. A policy can, for example, define a set of verifiable properties for the system call. For example, a simple policy can be provided as follows:

| Permit open | as | user Liang | |
|---|---|---|---|
| Parameter | 0 | equals/opt/qtopia/phonebook | |
| Parameter | 1 | Minimum Pattern Similarity equals | 85% |

The simple policy effectively define a rule for calling the system call "open ( )" system with the input parameter is "/opt/qtopia/phonebook" and requires at least 85% similarly with the behavioral pattern provided in a user profile for a user named "Liang." In this way, both the behavior and process states can be considered based on user profiles to deny access to process that deviate from expected limits.

In general, the dynamic system call tracking techniques of the invention can be applied to detect malware. In PC platform, a relatively large number of system calls could be invoked by attackers and there may be a need to capture a relatively large number of user input/output patterns. However, it will be appreciated that in mobile environments, a relatively smaller number of system calls and input/output operations need to be monitored. Furthermore, monitoring the system calls provides an Operating System-aware (OS-aware) approach that allows detection of malicious attacked initiated by "hijacked" applications and/or processes that would otherwise go undetected. Hashing user profiles to the kernel provides a secure and efficient solution for storing and using the user profiles. Also, the behavior-based techniques of the invention do not rely on known worm signatures and allow malware with an unknown signature to be detected based on any deviation from established process state transitions and user operational habits.

As noted above, a behavior analyzer can collect keypad/display pairs and generate behavior graphs for a learning engine. The learning engine can effectively learn patterns associated state transitions and input/output using, for example, a Hidden Markov Model (HMM) and hash the result to the kernel. As such, a policy-based detection engine can effectively authenticate a number of selected system calls based on the behavior detected on a device to reveal potentially malicious attempts. To effectively capture user operations and extract representative patterns of use or processing behavior on a mobile device (e.g., cell) Input/Output (I/O) events (e.g., user's keypad/touch-screen inputs and consequent LCD displays) can be monitored. In addition, the correlation between Input/Output (I/O) events can be captured and analyzed. In particular, cell phone platforms are unique in that a relatively limited number of key codes and event-driven displays are generally used. Therefore, it's relatively easier to select a set of monitoring points for a cell phone device and determine the granularity for logging events to effectively determine the complexity of analysis of the behavioral patterns.

Figure 6:
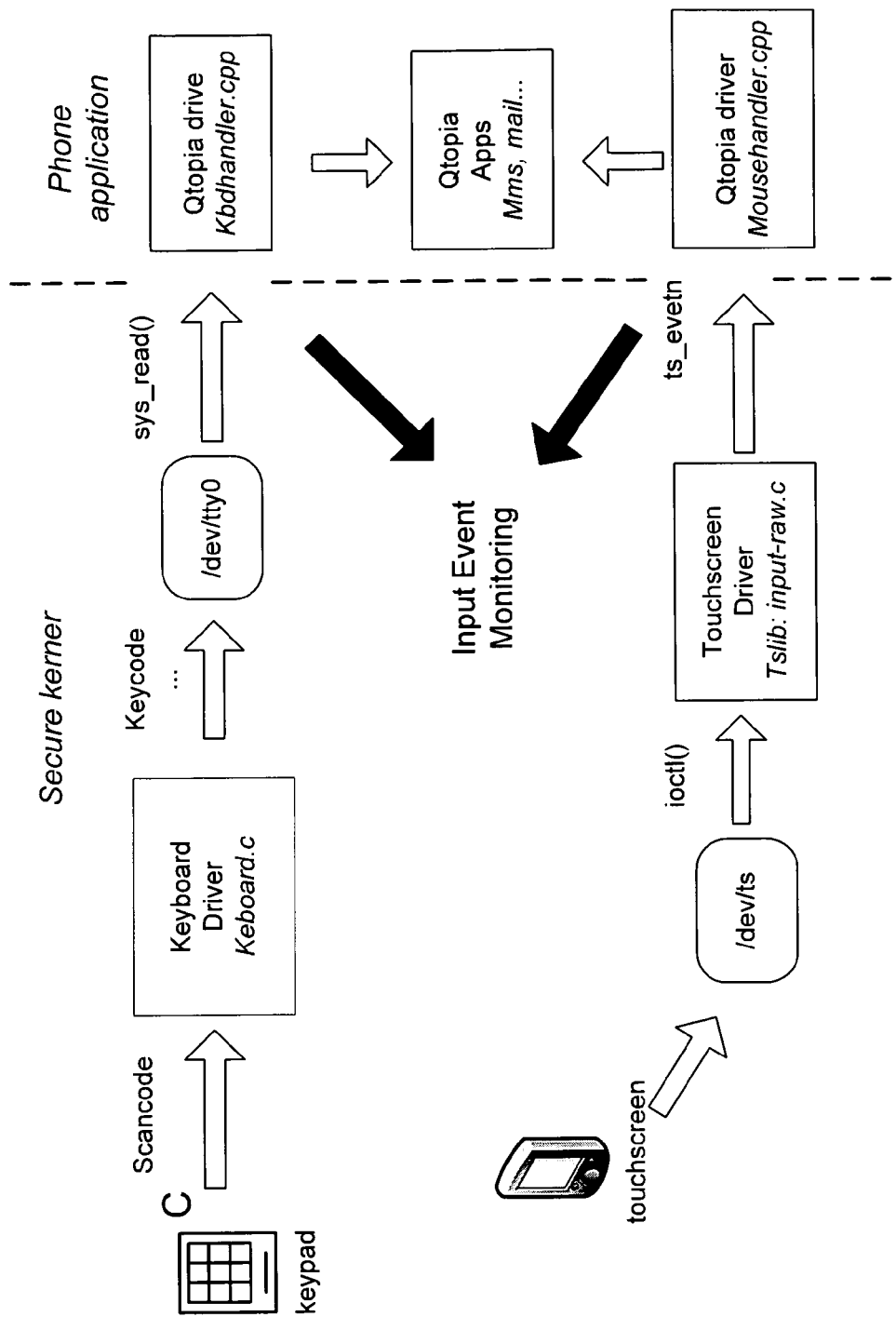
FIG. 6 depicts processing of user inputs from a keypad/touchscreen in accordance with one embodiment of the invention.

FIG. 6 depicts processing of user inputs from a keypad/touchscreen in accordance with one embodiment of the invention. Referring to FIG. 6, when a user presses a key, the keypad can send a corresponding raw scancodes to a keyboard driver (keyboard.c) in the kernel. The "handle scancode( )" function in the keypad driver parses the stream of scancodes and converts it into a series of key press and key release events called keycode by using a translation-table via a "kbd_translate( )" function. Each key can be provided with a unique pair of keycodes. For example, pressing key k produces keycode k (1~127), while releasing it produces the keycode k+128. The characters obtained in this manner can be periodically put into a standard input device: "/dev/tty0".

When a user process (e.g., "mmsclient") requires an input, it uses the application layer driver kbdhandler to read keypad input by calling: "KbdHandler::readKbdData( )," which invokes a system call: "sys read( )" to fetch the input keycodes from the standard input device "/dev/tty0". When a keycode has been read, driver kbdhandler translates it into a "Qt event" and passes it to the user process. For instance, when a user presses a "MENU/SELECT" (keycode 0x1c and 0x9c for push and release), the application is notified of an "Qtevent" (qtKeycode=Qt::Key Select) and "processKeyEvent(qtKeycode, . . . )" is invoked to handle the input.

To monitor user keypad inputs, a keystroke hook can be placed in the kernel to effectively intercept and log user keypad events before they are passed to the user processes. More specifically, a "hook" function can, for example, be provided for to the system call "sys_read( )" so that whenever an user application reads keycodes from the standard input device, the modified system call first executes the "hook" function. The "hook" function can, for example, record the keystroke on its keycode pair, duration between the key press and release, the time-stamp for an input event, and so on. For example, when the user presses key 'a', the following event can be collected in the log file.

{time stamp: code down('a'), duration, code up('a')}

For touch-screen inputs, a hook can be placed in a universal touchscreen driver: "tslib (input-raw.c)" to monitor the raw events (ts_event) that are received by user applications. The following attributes can be collected for each ts_evernt: {time stamp: pos.x, pos.y, pressure}, where {pos.x,pos.y} denotes the touch position and pressure reflects the pressure on the screen.

It should be noted that when an application reads a user input, it can translate the raw event into "QWSEvent" and further explained it. For example, Referring to FIG. 7, an application PhoneLaunchView (GUI) maps the touch position to a meaningful item code which is subsequently processed in the same way as a keypad input.

An alternative to the kernel-level monitoring described above is to trace user events through application-layer drivers. More particularly, referring to FIG. 7, hooks can be inserted into "kbdhandler.cpp" and "mousehandler.cpp" for logging "qtKeycode" and "QWSEvent." However, this approach may be less reliable because the application drivers themselves may have been compromised. Moreover, in addition to content, kernel-level monitoring can provide details pertaining to user-specific input patterns, such as, keystroke speed, touch-screen pressure, etc.

It should also be noted that a user could accidentally generate input that is not valid. For example, when a user opens an address book and uses navigation keys to choose a contact, only up/down/select key inputs may be valid and processed by the address book window. As such, other key inputs including left/right navigation keys or '*', '#' may be ignored. However, an event-logger may intercept from the kernel level raw input including invalid input accidently generated by the user. It will be appreciated that the raw input can be sanitized and filtered before performing further analysis.

One solution is to correlate keyboard/touch-screen inputs with LCD displays, such that only when the display frame buffer has some corresponding output to the LCD screen within a certain time period, the input is considered to be valid. Otherwise, the input would be ignored. Such correlation can be based on time-stamps of the input/output events. First, system calls in the frame buffer driver can be monitored for logging output events. More particularly, a hook can be placed in "Qtopia" Core (Qscreenlinuxfb.cpp) to record the occurrences of the system-call "mmap( )" which can be invoked in a display event. Frame buffer can be provided as an abstract device "(/dev/fb0)" by a kernel to allow user processes to write output to the LCD video memory. When an application view has data, Qtopia Core (Qt/embedded) invokes system call "open(/dev/fb0, . . . )" to open the frame buffer device and mmap( ) to map the device to the application's address space. Next, Qtopia Core invokes system calls munmap( ) and close( ) to cancel the address map and effectively close the device.

A time-stamp can be used to label each address-mapping system call mentioned above. To verify an input, the display event-log can be searched to determine whether a mmap( ) exists which immediately follows the input event within a certain time window. Because each valid input typically incurs an update of the current application view and the corresponding output will be written to the frame buffer, at least one mmap( ) should be detected. Monitoring framebuffer content can be difficult. As such, it will be appreciated that a time-based correlation may be a more practical approach. One factor is determining the length of the time window. For most cell phones, response towards an input is quick and a short time window (≤0.5 second) could be determined.

After sanitizing and/or filtering user input events, a behavior graphs can be generated. The behavioral graphs can reflects intermediate process states towards each one of a number of critical or key system calls. As noted above, system calls, such as open( ) and socket( ), are typically invoked by processes to accesses important system resources (e.g., addressbook, modem). However, the process states can be observed in relation to user's keypad operations and the GUI displays. These observations can reflect behavior of on-going processes. For instance, user applications such as messaging, phone call, and user-contact lookup/edit, open an "addressbook" file for different purposes. Therefore, for the system call open ("addressbook", . . . ), the event logs can be used to construct a directed behavior graph "Gopenbased" based on data captured from the key-pad inputs and GUI displays. In directed behavior graph, observations can be defined as graph nodes and evolutions (links or transitions) between observations as directed edges.

Figures 7, 8:
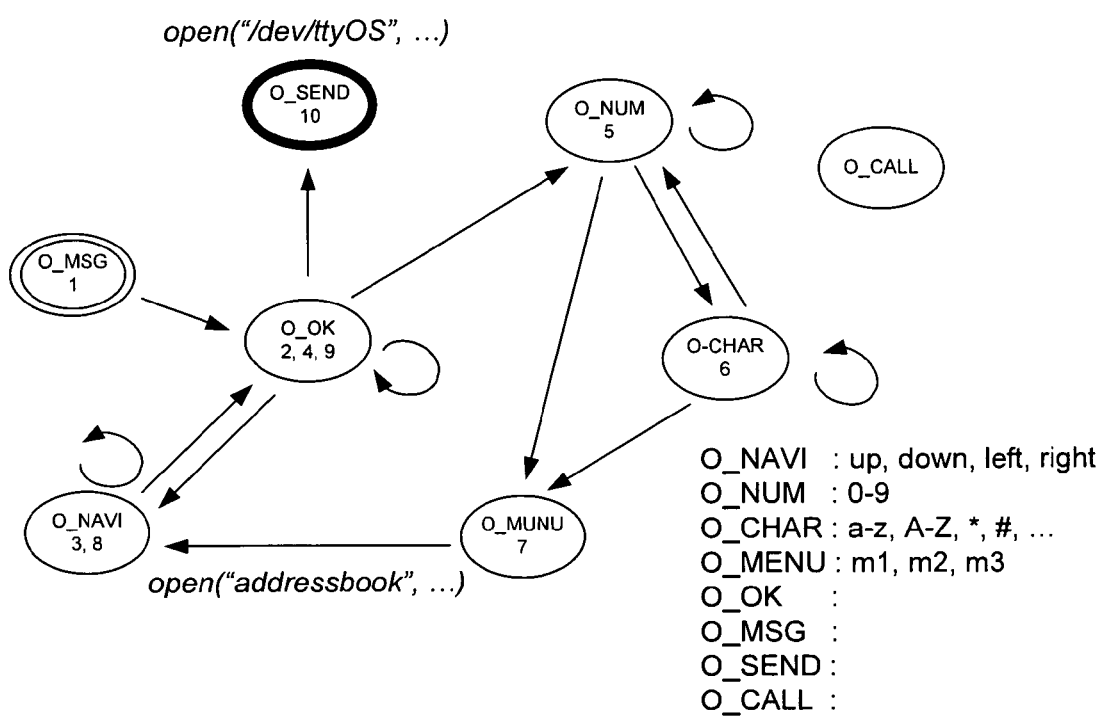
FIG. 7, an application PhoneLaunchView (GUI) maps the touch position to a meaningful item code which is subsequently processed in the same way as a keypad input.
FIG. 8 depicts a behavior graph for a text-messaging process in accordance with one embodiment of the invention.

To elaborate even further, FIG. 8 depicts a behavior graph for a text-messaging process in accordance with one embodiment of the invention. First, raw keypad inputs can be classified into a number of independent key observations, each including one or a series of consecutive key operations represented in the behavior graph. For example, observation "O_NUM" can represent operations on number keys (0-9) while observation "O_MSG" represents operations on a messaging key itself. We then examine evolutions (links or transitions) between these observations (or nodes). Referring to FIG. 7, a user who can initiate a messaging process first enters the GUI by pressing a messaging key and chooses an appropriate service type using navigation keys (step 1~4). The user can then compose message content using numeric or alphabetic keys and start the delivery through a menu selection (step 5~7). Finally, the user can press navigation keys (up/down) to select a recipient from the "addressbook" and touch the send key to transmit the message (step 8~10). Such evolutions can be extracted from the event logs. It should be noted that a behavior graph can also reflect the user's operational pattern during a messaging process. For example, each observation can be associated with its averaged key press/release duration and each evolution between two observations can be associated with a time duration. In order to obtain a complete behavior graph for a system call (e.g., open("address book", . . . )), all of the related resource-requesting processes can be considered and their behavior graphs can be merged into a uniform one towards the system call.

A learning engine can takes behavior graphs as inputs and effectively learn intermediate state transitions of applications. In addition, the learning engine can learn the user input patterns from the behavior graphs. To profile process behavior in a mobile device (e.g., a cell phone), a Hidden Markov Model (HMM) can be used. As will be known to those skilled in the art, a HMM can be used to model finite-state stochastic processes, in which the true state of the system is unknown and thus is represented with hidden random variables. What is known are observations that depend on the state and represented with known output variables. One common problem of interest in an HMM is the parameter estimation problem, where parameters such as the transition probabilities among states are learned (estimated) from sequences of observations.

Those skilled in the art will appreciate that a number of states N for the resource-requesting processes can be determined for various devices. Traditional methods suggest choosing process states roughly corresponding to the number of distinct system calls used by the program. However, it may not be neither feasible and/or desirable to assume processes invoke a same set of system calls especially for mobile devices where dealing with a relatively large number of states (40≤N≤60) is not currently desirable given the resources available today. It will be appreciated that a model size N roughly corresponding to the number of unique key observations can be chosen which can be relatively small due to the limited number of keys that are currently available on mobile devices. It should be noted that the process states can be fully connected and transitions can be made from any state to any other state. For some applications, key observations can essentially be observed user reactions towards the current application GUIs (i.e., process states) through appropriate key inputs.

Figure 9:
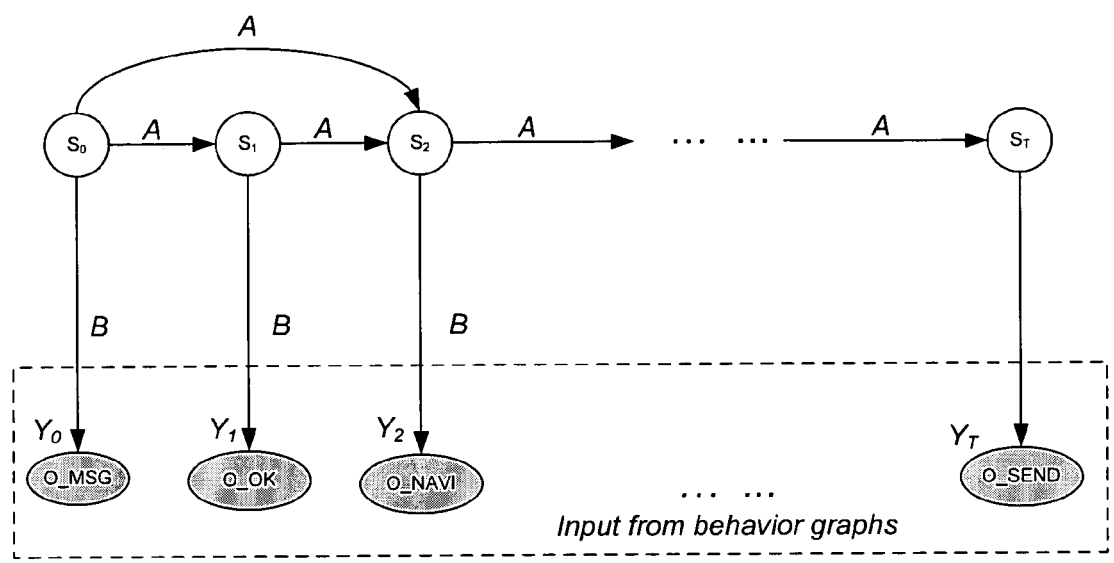
FIG. 9 depicts HMM state transitions for a single messaging process in accordance with one embodiment if the invention.

FIG. 9 depicts HMM state transitions for a single messaging process in accordance with one embodiment of the invention. Referring to FIG. 9, HMM state transitions are represented as a statistical graphical model, where circles represent random variables, shaded circles ($y_i$) are key observations, and unshaded circles ($s_i$) are unknown state variables. The arrows from $s_i$ to $s_i+1$ and from $s_i$ to $y_i$ indicate that the latter is conditionally dependent on the former. The value on the arrow is an entry in a probability matrix. So: "$p(s_{i+1}|s_i)=a_{s_i s_{i+1}}$," which is the probability of state $s_i+_1$ appears after the state $s_i$. "$p(y_i|s_i)=b_{s_i}(y_i)$" is the probability the user reacts $y_i$ to state $s_i$ in the previous step. Note that for simplicity, a simple HMM based on behavior graphs for a text messaging operation is demonstrated. However, many operation including, for example, phone calls, messaging and contact lookups/changes, etc can be captured while a mobile device is being used. Behavior graphs of the processes that access key resources (key-resource-accessing processes) can be generated and fed into an HMM as the input data (observations), such that transition probabilities (1) between each pair of process states (matrix A), and (2) between each pair of process states and observations (matrix B) can be statistically learned. HMMs learning can, for example, be conducted by a Baum-Welch or forward-backward algorithm.

However, traditional HMM learning methods do not typically consider a user's operational preference during state transitions. Traditional HMM learning techniques can be augmented in accordance with the invention. To further elaborate, a time feature of the user operations will be used as an example to show how to augment an HMM for learning the behavior of a user of a mobile device. As noted above, within a behavior graph, the averaged key press/release duration for each key observation and the time duration for each evolution between key observations can be measured. This information can be used to augment a traditional HMM method.

More particularly, a HMM model $\lambda=(A,B,\pi)$ which includes state transition probability distribution A, observation symbol probability distribution B, and initial state distribution $\pi$ can be built using the following notation:
T=length of the sequence of observations (behavior graph)
N=number of process states in the model
M number of possible key observations
$S=\{s_1, s_2, \ldots, s_N\}$: finite set of possible process states
$V=\{v_1, v_2, \ldots, v_M\}$: finite set of possible key observations
$A=\{a_{i,j}\}$: N×N matrix, $a_{i,j}=P(q_t+1=s_j|q_t=s_i)$ $B=\{b_j^t(k)\}$: N×T×M matrix, $b_j^t(k)=P(O_t=v_k|q_t=s_j,t)$ where temporal information which reflects user operational preferences into the key observations are encoded. Now that an output probability of a sequence of key observations is obtained:

$$P(O_1, O_2, O_3, \ldots, O_T | q_j = s_j)) = \prod_{t=1}^{T} P(O_T | q_j = s_j, t) \quad (1)$$

Let $\xi_t(i,j)$ denote the probability of being in state $s_i$ at time t, and the state $s_j$ at time t+1, to derive an extended version of a Baum-Welch algorithm [ ]:

$$\xi_t(i, j) = P(qt = si, qt+1 = sj | O, \lambda) \quad (2)$$

$$= \frac{\alpha_t(i) a_{ij} b_j^{t+1}(O_{t+1}) \beta_{t+1}(j)}{\sum_{i=1}^{N} \sum_{j=1}^{N} \alpha_t(i) a_{ij} b_j^{t+1}(O_{t+1}) \beta_{t+1}(j)}$$

Forward variable $\alpha_t(i)=P(O_1 \ldots O_t, i_t=s_i|\lambda)$ is defined as the probability that the model is in state si at time t and has generated observations up to step t. Backward variable $\beta_t(j)$ is analogously defined to be the probability that the model is in state $s_i$ at time t and will generate the remainder of the given target observations. Using the EM approach, a new model $\bar{\lambda}=(\bar{A},\bar{B},\bar{\pi})$ can be re-estimated using the following equations and $$\bar{\pi}_i \sum_{j=1}^{N} \xi_1(i, j), \bar{a}_{ij} = \frac{\sum_{t=1}^{T-1} \xi_t(i, j)}{\sum_{t=1}^{T-1} \sum_{j=1}^{N} \xi_t(i, j)} \quad (3)$$

$$\bar{b}_j^t(k) = \frac{\sum_{t=1}^{T} \left( \delta(O_t, v_k) \sum_{j=1}^{N} \xi_t(i, j) \right)}{\sum_{t=1}^{T-1} \sum_{j=1}^{N} \xi_t(i, j)} \quad (4)$$

$(\delta(O_t, v_k)=1$, if $O_t=v_k$, and 0 otherwise.

In each round of behavior learning, $\lambda$ can be replaced by the estimated $\bar{\lambda}$, based on a training set of behavior graphs. Given that $P(O|\bar{\lambda}) > P(O|\lambda)$ [ ], it means that $\lambda$ converges to the actual model. A final $\lambda$ can be obtained when some convergence criterion is met (e.g., sufficiently small change in the estimated values of the parameters on subsequent iterations).

Generally, manufactured devices (e.g., cell phones) are not initially compromised. As such, as soon as device is purchased and used, activities of one or more users of the device can be automatically collected. For example, user activities on the phone including calling, messaging, and emailing can be automatically collected and used to generate training data to learn the behavior of the user(s). In addition, a user can explicitly (actively) add her normal activities to the records by starting, for example, an event logger.

It should be noted that various types of profiles can include an application profile and a user-application profile. In an application profile, only key sequences in the behavior graphs may be provided for learning. In other words, user operational preferences such as transition times need not be considered. Therefore, a more traditional HMM can be used for training and learning. As a result, the application profile can, for example, be represented as "$\lambda_{mms}=(A,B,\pi)$" to reflects the normal or expected process behavior of an MMS application on a cell phone. On the other hand, in a user-application profile, both key sequences and user's operational preference can be considered. Hence an augmented (or extended) HMM can be adopted for training. As a result, user-application profile can be represented as: "$\lambda_{(mms,i)}=(A',B',\pi')$ to reflect the normal or expect process behavior of an MMS application operated by a user i.

Further, a learning system can be implemented to learn application profiles for the purpose of malware detection. These profiles can be shared by various devices using the same version of an application framework. A more enhanced learning system can be implemented to learn user-application profiles for different users that my use the same device. These profiles can be made specific to each device.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for behavior-based malware detection on a device comprising:
   detecting one or more system calls in an application kernel of the device;
   monitoring at least one user input event and at least one display event associated with said one or more system calls;
   constructing a behavior graph based on said one or more system calls, said at least one user input event, and said at least one display event;
   observing one or more event pairs in the behavior graph, wherein each event pair comprises a user input event that is correlated with a display event;
   based on said one or more event pairs, extracting user-behavior features from the behavior graph, wherein said user-behavior features comprise one or more acceptable user behavioral patterns and transition information relating to said one or more event pairs;
   storing said extracted user-behavior features in a user profile; and
   detecting unauthorized use of the device by detecting a deviation from said one or more acceptable user behavioral patterns stored in the user profile.

2. The method of claim 1, wherein:
   said at least one user input event influences said one or more system calls;
   said at least one display event reflects display changes based on said one or more system calls;
   said one or more acceptable user behavioral patterns further comprise unique patterns of user inputs and outputs based on said at least one user input event and said at least one display event;
   said transition information relating to said one or more event pairs comprises a sequence of process state transitions relating to said one or more event pairs;
   said one or more acceptable user behavioral patterns includes information about an amount of time between said one or more user input events.

3. The method of claim 1, wherein said one or more acceptable user behavioral patterns includes information about a duration of each user input event.

4. The method of claim 1, wherein:
detecting a deviation from said one or more acceptable user behavioral patterns stored in the user profile comprises comparing a current pattern of usage to said one or more acceptable user behavioral patterns, and preventing a system call when said current pattern of usage does not match any of said one or more acceptable user behavioral patterns with a predefined tolerance; and
the predefined tolerance is stored in the user profile.

5. The method of claim 1, wherein the method is performed in real-time as kernel level events are attempted to be executed.

6. An apparatus comprising:
a usage pattern detection subsystem comprising:
an activity monitor component configured to:
detect one or more system calls; and
monitor at least one user input event and at least one output event associated with said one or more system calls; and
a pattern generation component configured to:
construct a behavior graph based on said one or more system calls, said at least one user input event, and said at least one display event;
observe one or more event pairs in the behavior graph, wherein each event pair comprises a user input event that is correlated with a display event; and
based on said one or more event pairs, extract user-behavior features from the behavior graph, wherein said user-behavior features comprise one or more acceptable user behavioral patterns and transition information relating to said one or more event pairs;
an unauthorized use testing sub-system configured to detect unauthorized use of the apparatus by detecting a deviation from said one or more acceptable user behavioral patterns; and
a memory storing a user profile comprising said one or more acceptable user behavioral patterns.

7. The apparatus of claim 6, wherein:
said at least one user input event influences said one or more system calls;
said at least one display event reflects display changes based on said one or more system calls;
said one or more acceptable user behavioral patterns further comprise unique patterns of user inputs and outputs based on said at least one user input event and said at least one display event;
said transition information relating to said one or more event pairs comprises a sequence of process state transitions relating to said one or more event pairs;
detecting a deviation from said one or more acceptable user behavioral patterns comprises comparing a current pattern of usage to said one or more acceptable user behavioral patterns, and issuing an indication of unauthorized use when said current pattern of usage does not match any of said one or more acceptable user behavioral patterns with a predefined tolerance; and
the apparatus is a mobile phone.

8. The apparatus of claim 7, wherein said one or more system calls are kernel level system calls.

9. The apparatus of claim 7, wherein the indication of unauthorized use causes the apparatus to prevent one or more system support provider components to be used by an application program issuing a system call.

10. The apparatus of claim 7, wherein the indication of unauthorized use causes the apparatus to issue a warning and/or error message.

11. The apparatus of claim 7, wherein the indication of unauthorized use causes the apparatus to perform diagnostics.

12. An apparatus for behavior-based malware detection on a device comprising:
means for detecting one or more system calls in an application kernel of the device;
means for monitoring at least one user input event and at least one display event associated with said one or more system calls;
means for constructing a behavior graph based on said one or more system calls, said at least one user input event, and said at least one display event;
means for observing one or more event pairs in the behavior graph, wherein each event pair comprises a user input event that is correlated with a display event;
means for extracting, based on said one or more event pairs, user-behavior features from the behavior graph, wherein said user-behavior features comprise one or more acceptable user behavioral patterns transition information relating to said one or more event pairs;
means for storing said extracted user-behavior features in a user profile; and
means for detecting unauthorized use of the device by detecting a deviation from said one or more acceptable user behavioral patterns stored in the user profile.

13. The apparatus of claim 12, wherein:
said at least one user input event influences said one or more system calls;
said at least one display event reflects display changes based on said one or more system calls;
said one or more acceptable user behavioral patterns further comprise unique patterns of user inputs and outputs based on said at least one user input event and said at least one display event;
said transition information relating to said one or more event pairs comprises a sequence of process state transitions relating to said one or more event pairs; and
detecting a deviation from said one or more acceptable user behavioral patterns stored in the user profile comprises comparing a current pattern of usage to said one or more acceptable user behavioral patterns, and preventing a system call when said current pattern of usage does not match any of said one or more acceptable user behavioral patterns with a predefined tolerance.

14. The apparatus of claim 12, wherein a user input event represents user input received from a touchscreen display.

15. The apparatus of claim 12, wherein a user input event represents user input received from a keypad.

16. The apparatus of claim 12, wherein the user profile further comprises normal user activities.

17. A non-transitory program storage device readable by a machine, tangibly embodying a set of computer instructions executable by the machine to perform a method for behavior-based malware detection on a device, the method comprising:
detecting one or more system calls in an application kernel of the device;
monitoring at least one user input event and at least one display event associated with said one or more system calls;
constructing a behavior graph based on said one or more system calls, said at least one user input event, and said at least one display event;

observing one or more event pairs in the behavior graph, wherein each event pair comprises a user input event that is correlated with a display event;

based on said one or more event pairs, extracting user-behavior features from the behavior graph, wherein said user-behavior features comprise one or more acceptable user behavioral patterns and transition information relating to said one or more event pairs;

storing said extracted user-behavior features in a user profile; and detecting unauthorized use of the device by detecting a deviation from said one or more acceptable user behavioral patterns stored in the user profile.

18. The non-transitory program storage device of claim 17, wherein:

said at least one user input event influences said one or more system calls;

said at least one display event reflects display changes based on said one or more system calls;

said one or more acceptable user behavioral patterns further comprise unique patterns of user inputs and outputs based on said at least one user input event and said at least one display event;

said transition information relating to said one or more event pairs comprises a sequence of process state transitions relating to said one or more event pairs;

detecting a deviation from said one or more acceptable user behavioral patterns stored in the user profile comprises comparing a current pattern of usage to said one or more acceptable user behavioral patterns, and preventing a system call when said current pattern of usage does not match any of said one or more acceptable user behavioral patterns with a predefined tolerance; and said one or more acceptable user behavioral patterns stored in the user profile are dynamically adjusted based on applications used.

19. The non-transitory program storage device of claim 17, wherein said user-behavior features are used to determine whether to prevent system call from being executed.

20. The non-transitory program storage device of claim 17, wherein the user profile is hashed.

21. The non-transitory program storage device of claim 17, wherein the extracting is performed by a Hidden Markov Model learning engine.

* * * * *